Sept. 12, 1950 C. R. WALKER 2,522,003

TELETYPEWRITER SWITCHING SYSTEM

Filed Aug. 2, 1948 5 Sheets-Sheet 1

INVENTOR
C. R. WALKER
BY H. A. Patterson
ATTORNEY

Sept. 12, 1950 C. R. WALKER 2,522,003

TELETYPEWRITER SWITCHING SYSTEM

Filed Aug. 2, 1948 5 Sheets-Sheet 2

INVENTOR
C. R. WALKER
BY H. A. Patterson
ATTORNEY

Sept. 12, 1950 C. R. WALKER 2,522,003

TELETYPEWRITER SWITCHING SYSTEM

Filed Aug. 2, 1948 5 Sheets-Sheet 3

INVENTOR
C. R. WALKER
BY H. A. Patterson
ATTORNEY

Sept. 12, 1950 C. R. WALKER 2,522,003

TELETYPEWRITER SWITCHING SYSTEM

Filed Aug. 2, 1948 5 Sheets-Sheet 4

INVENTOR
C. R. WALKER
BY
ATTORNEY

Sept. 12, 1950 C. R. WALKER 2,522,003

TELETYPEWRITER SWITCHING SYSTEM

Filed Aug. 2, 1948 5 Sheets-Sheet 5

INVENTOR
C.R. WALKER
BY
Ha Patteson
ATTORNEY

Patented Sept. 12, 1950

2,522,003

UNITED STATES PATENT OFFICE 2,522,003

TELETYPEWRITER SWITCHING SYSTEM

Charles Robert Walker, Jersey City, N. J., assignor to American Telephone and Telegraph Company, a corporation of New York Application August 2, 1948, Serial No. 41,944

5 Claims. (Cl. 178—2)

This invention relates to telegraphy and particularly to teletypewriter switching systems.

An object of the invention is to connect any one or group or all of a plurality of receiving stations to a telegraph channel to receive message material transmitted over the channel.

Another object of the invention is to disconnect from the channel any connected one of the receiving stations only upon the selective connection of another station to the channel so that at no time is the telegraph channel without a connected receiving station.

Another object of the invention is to disconnect any connected one of the receiving stations incident to the selective connection of another station to the channel.

Another object of the invention is to provide a plurality of switching stations associated with a communication channel, each serving a plurality of receiving stations, and being so arranged that when a switching operation takes place at one of the switching stations to connect one of its receiving stations to the telegraph channel, any receiving station then connected to the channel, whether served by that switching station or another switching station, will be automatically disconnected from the channel.

The invention features the use of telegraph signal controlled switching instrumentalities for selectively connecting receiving stations to the telegraph channel in response to station designating or switching code signals.

The invention also features relay circuits and locking circuits therefor for connecting the receiving stations to the telegraph channel under the control of the signal responsive switching instrumentalities.

The invention also features interrelated locking circuits for all of the switching relays at any one switching station so that the selective operation of one such relay at a station will cause to be interrupted the locking circuits of all other switching relays at that switching station.

The invention also features an arrangement whereby the switching instrumentality at each switching station, upon responding to switching signals assigned to receiving stations served by other switching stations, unlocks its own switching relays if any is operated.

In accordance with a preferred embodiment of the invention a message originating point or station has transmitting equipment connected to a telegraph line or channel extending to one or more switching stations, each of which has signal responsive equipment associated with the one channel. Each of the switching stations is provided with a permutation code selector mechanism having contacts arranged to be selectively closed momentarily in response to permutation code signals transmitted over the telegraph channel from the message originating station. These contacts are arranged to control the circuits of switching relays. Certain relays perform a preparatory or activating function and are operative by contacts in the permutation code selector mechanism, if operated in predetermined order or sequence in response to their code signals, namely, Figures and H, received in that sequence, to associate with station selecting contacts of the permutation code selector mechanism, individual switching relays that are operable to connect to the telegraph channel individual lines extending to receiving stations. After the activating relays have been operated, the next received signal, if it represents a particular receiving station to be selected, will operate its assigned contact in the permutation code selector mechanism and if the signal represents a receiving station served by that switching station, the associated switching relay will be operated to connect the selected line to the telegraph channel and this relay will be locked in the operated condition.

The locking circuits for the switching relays are interrelated, so that only one of them at a switching station may be locked at any one time. Any such relay upon operating interrupts the locking circuits of all others and releases any that may have been locked at the time it operated. The code which follows a line selecting code is the Letters signal and the reception of this code results in the deactivation of the switching system by effecting the release of the preparatory or activating relays. The letters signal is followed by the message, which will be received by the receiving station associated with the connected line. Although the permutation code selector mechanism receives all signals contained in the body of the message, no further switching operations occur because the switching mechanism has been deactivated.

At the conclusion of the message, assuming that there is no other message to be transmitted, the system remains dormant with the connected station remaining connected. When another message is to be transmitted to a different station the activating sequence of code combinations is again transmitted to prepare for the selective connection of another line. If the line to be selectively connected is served by the same switching office, the operation of its switching relay will result in the interruption of the locking circuit for the previously operated switching relay and that relay will be released.

When two or more switching stations are provided, each having lines to be connected to the telegraph channel, contacts in the permutation code selector mechanism at each switching station that are operable in response to selecting code signals for lines served by other switching stations are connected in multiple to the operating circuit of a release relay to release any operated switching relay thereat. In this way the selective connection of a line to the communication channel anywhere in the system will result in the disconnection of a previously connected line anywhere in the system.

With an arrangement as hereinbefore described in which a line may be disconnected only incident to the connection of another line, at no time is the telegraph channel without a connected line and it is not possible for messages to be completely lost because a message not preceded by a selecting code signal will be received at the station which was last selected to receive a message.

In addition to the individual line connecting relays at each switching station there may be one or more group or broadcast switching relays which have their locking circuits intercontrolled by all of the individual line selecting or switching relays in the same way that their locking circuits are interrelated. The signal responsive contacts which operate the broadcast or group switching relays are responsive to the same code signal at all switching stations serving lines involved in the group. Upon the transmission of the broadcast code signal following the activating signal sequence, the broadcast switching relay at each switching station will be operated to connect to the telegraph channel all lines served by that switching station that are included in the group and each such relay will lock operated, and at that switching station which had an individual switching relay locked for the reception of a previous message, such relay will be released, the station, however, if included in the group, remaining connected because the broadcast switching relay is operated. Also, when the broadcast relays are locked, and the broadcast message has been completed, and thereafter code signals are transmitted to select an individual line served by a switching station, the broadcast relay will be released by the direct interruption of its locking circuit by the selected individual switching relay at that switching station and at other stations the broadcast relays will be released by the operation of the release relay due to the reception of a selecting code which is not assigned to any of the receiving station lines served by those switching stations.

For a complete understanding of the invention reference may be had to the following detailed description to be interpreted in the light of the accompanying drawings in which.

Figure 1:
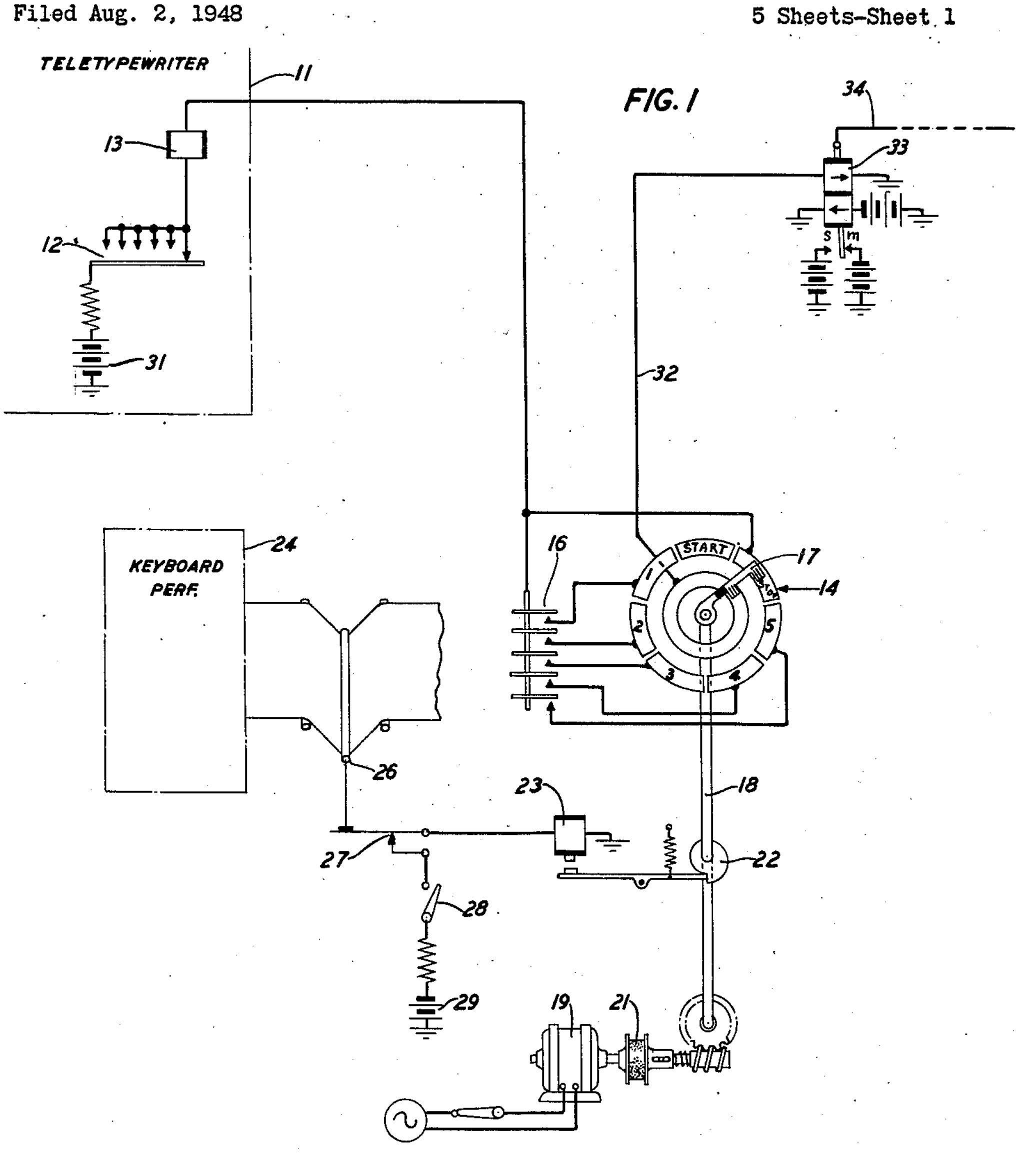
Figure 1 is a view showing the circuits of a message originating station.
Figure 6:
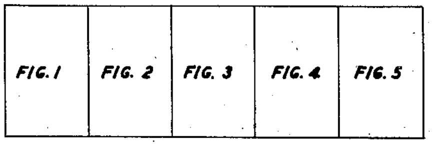
Fig. 6 is a diagrammatic view showing how Figs. 1 to 5, inclusive, are to be arranged to represent a complete system.

Referring now to Fig. 1, the elements shown in a dotted line rectangle designated by the reference numeral 11 represent a teletypewriter printer and keyboard transmitter comprising a unit which may be of the type shown in Patent 1,904,164 granted April 18, 1933 to S. Morton et al. and the disclosure of the Morton patent is incorporated herein by reference as part of the present specification. The keyboard transmitter is represented symbolically by the transmitting contacts 12 and the teletypewriter printer is represented symbolically by the magnet 13 which is the selector magnet of the printer and is responsive to signals to cause the printing of characters or the accomplishment of functions corresponding to the signals. In addition to the keyboard transmitter 12, the station may also be provided with a tape transmitter 14. This transmitter may be of the type shown in Patent 2,055,567 granted September 29, 1936 to E. F. Watson, and the disclosure of this patent is incorporated herein by reference as part of this specification. The transmitter comprises an outer segmented ring including start, code and stop impulse segments, the code impulse segments being connected to tap sensing contacts 16, a continuous or closed inner conductive ring, interconnected brushes engaging the outer and inner rings of the distributor and carried by brush arm 17, a driving shaft 18 to which the brush arm 17 is secured, a motor 19 for driving shaft 18 through friction clutch 21, and a stop cam 22 for arresting shaft 18 under the control of stop magnet 23. Perforated tape containing signals to be transmitted by transmitter 14 may be supplied by keyboard perforator 24 which may be of the type shown in Patent 1,182,179 granted May 9, 1916 to C. L. Krum et al. Perforated tape passing from keyboard perforator 24 to tape transmitter 14 is engaged by a taut tape member 26 which closes contacts 27 when a loop of tape of predetermined dimensions has been formed. If manual switch 28 has been closed prior to the formation of the loop, a circuit will be traced upon the closeure of contacts 27 from battery 29, through switch 28, contacts 27 and winding of magnet 23 to ground, to disengage the armature of stop magnet 23 from stop cam 22 and permit shaft 18 to be driven by motor 19.

A circuit is traced from battery 31 through the stop or rest contacts of keyboard transmitter 12 when that transmitter is at rest, selector magnet 13 of the teletypewriter printer, stop or rest segment, brushes and closed ring of transmitter 14, conductor 32 and operating winding of transmitting relay 33 to ground to hold selector magnet 13 energized and to hold relay 33 operated to its marking contact. Relay 33 has a biasing winding provided with a battery connection to drive the armature to the spacing contact when the operating winding is deenergized, the operating winding predominating when it is energized and holding the armature of the relay on its making contact. Marking impulses generated by keyboard transmitter 12 or tape transmitter 14 provide a closed circuit condition for selector magnet 13 and transmitting relay 33 to hold the selector magnet in the marking condition and to hold the armature of relay 33 on its marking contact. Spacing signals generated by keyboard transmitter 12 or tape transmitter 14 are represented by an open circuit condition, releasing selector magnet 13 and permitting the armature of transmitting relay 33 to engage the spacing contact. Selector magnet 13 of the teletypewriter printer responds to signals generated by keyboard transmitter 12 or tape transmitter 14 and provides a printed record of messages as they are transmitted. It will be understood that messages may be transmitted from either transmitter, but that both may not be operated simultaneously.

The marking and spacing contacts of transmitting relay 33 are connected to batteries of oposite polarity to provide polar signals. The armature of transmitting relay 33 is connected to a telegraph line or channel 34 which extends into Fig. 2, which shows a switching station, where it connects serially to the operating windings of a plurality of repeating relays 36, 37, 38 and 39. Telegraph line 34 then extends across Fig. 3 and into Fig. 4, which shows another switching station, where it connects serially to the operating windings of repeating relays 111, 112 and 113. Telegraph line 34 may extend to and through other switching stations such as the station indicated diagrammatically in Fig. 5 by the reference number 141, and ultimately terminates at ground potential.

Figure 2:
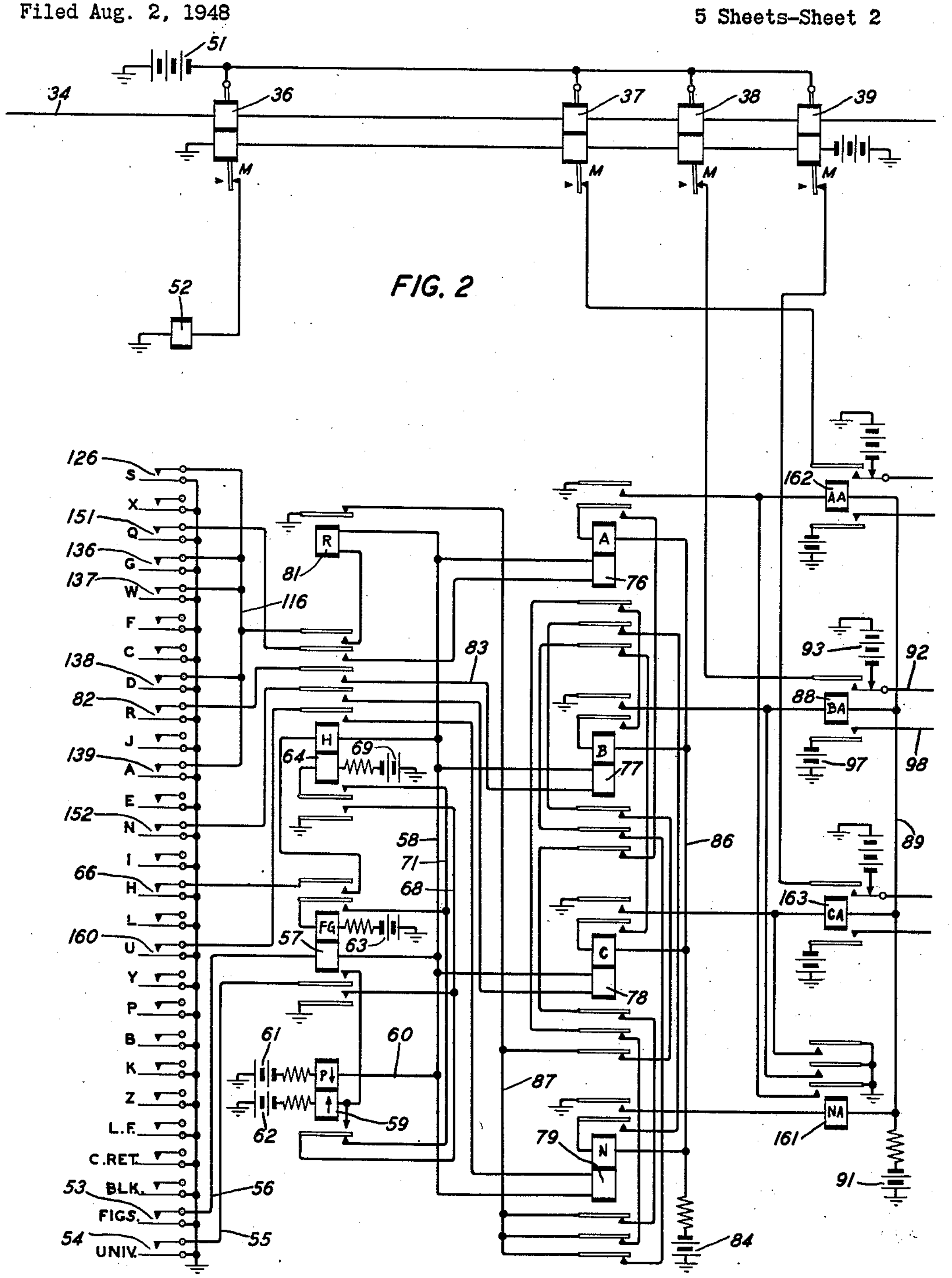
Fig. 2 is a view showing the circuits of a switching station.
Figure 4:
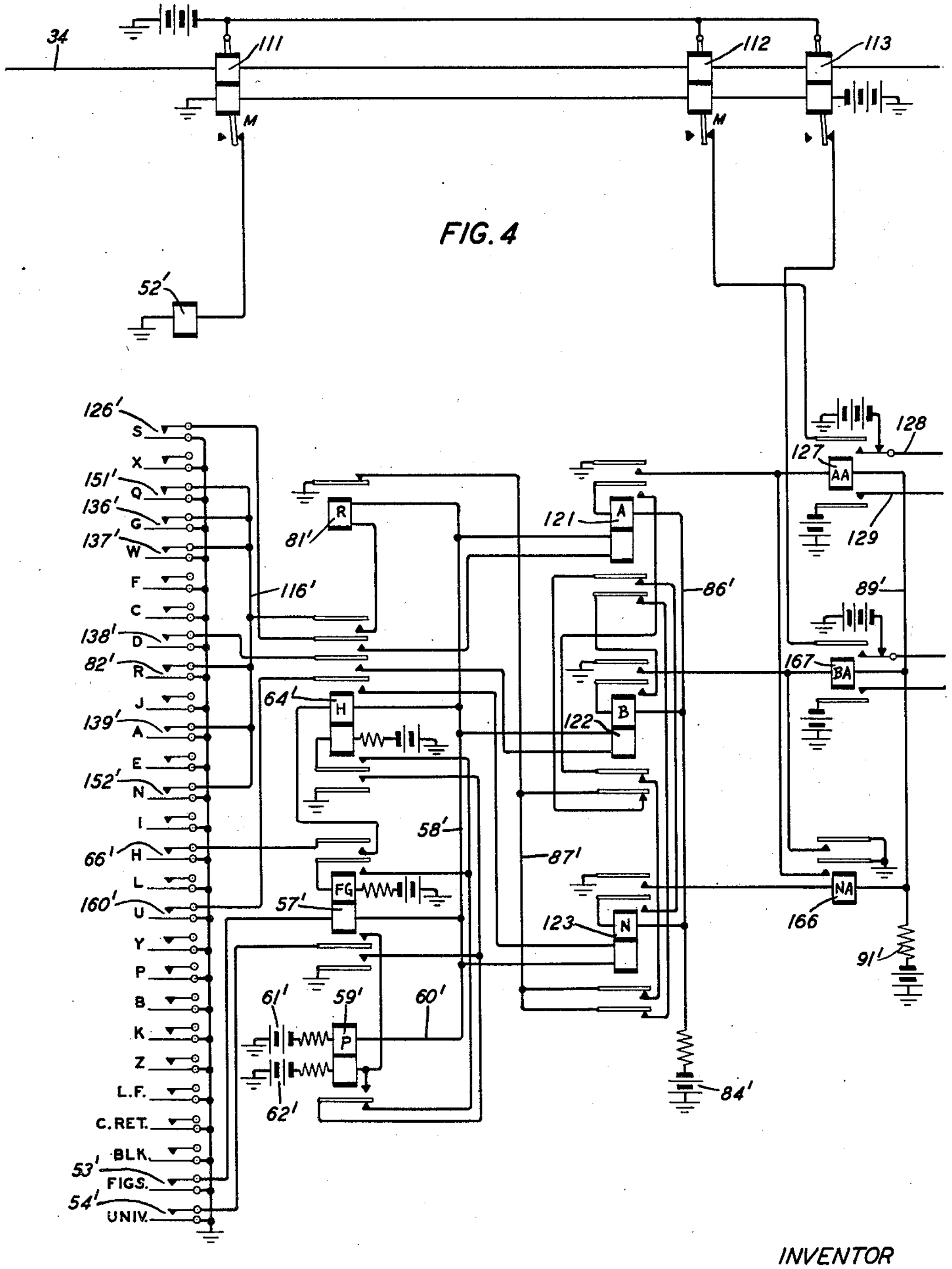
Fig. 4 is a view showing the circuits of a second switching station.

Since the transmitting relay 33 transmits polar signals the receiving relays 36, 37, 38, 39, 111, 112 and 113 are polar relays. With polar operation of such relays, it is not essential that they be provided with biasing windings but they may be so equipped and battery potentials of the proper polarity may be supplied to those windings as indicated in Figs. 2 and 4.

The armature of relay 36 is connected to battery 51 and the marking contact is connected to ground through the winding of the selector magnet 52 of a contact operating permutation code selector mechanism or monitoring selector. A device of this type is shown and described in detail in Patent 2,112,234 granted March 29, 1938 to J. F. Beattie et al. and the disclosure of this patent is incorporated herein by reference as part of the present specification. The structure of the monitoring selector equipment employed in this invention is substantially the same as that disclosed in the Beattie patent and operates in substantially the same manner. Its function is to close electrical contacts selectively and momentarily in response to the reception of telegraph signal code combinations.

It will be assumed that keyboard transmitter 12 is operated to select a particular receiving station and transmit a message thereto, or that a tape containing such a message has been prepared in keyboard perforator 24 and that tape transmitter 14 has been started. The sequence of code combinations transmitted is Figures, the letter H, a letter of the alphabet representing the designation of the station to which the message is directed, Letters and the message itself.

Upon the reception of the code combinations representing Figures the contacts 53 close momentarily. Contacts 54 also close momentarily, these being universal contacts that are operated each time the monitoring selector receives a code combination regardless of the selective nature of that code combination.

A circuit is traced from ground through closed contact 53, conductor 56, lower winding of relay 57 to conductors 58 and 60, upper winding of relay 59 to battery 61. Relay 57 operates and at its inner lower armature and front contact it completes a circuit, during the time that universal contacts 54 remain closed, from battery through the closed contacts 54, the noted armature and front contact of relay 57 and the lower winding of relay 59 to battery 62. It follows from this that both windings of relay 59 become energized, the upper winding first and then the lower winding. The lower winding of relay 59 seeks to operate the armature of that relay to its first contact but the upper winding predominates and holds the armature on its back contact.

The relay 57 also completes for itself a holding circuit traced from battery 63 through the upper winding of that relay, the inner upper front contact and armature, conductor 71, the back contact and armature of relay 59, conductor 68, and the outer lower armature and front contact of relay 57 to ground. At its outer upper armature the relay 57 prepares an energizing circuit for relay 64. Upon the opening of contacts 53 and 54 of the monitoring selector, the lower winding of relay 57 and both windings of relay 59 become deenergized, relay 57 remaining operated due to the previously traced locking circuit.

The next code combination that should be and is presumed to be received is that representing the letter H which will cause the momentary operation of contacts 66. These contacts complete a circuit from ground through the outer upper front contact and armature of relay 57, upper winding of relay 64, conductors 58 and 60 and through the upper winding of relay 59 to battery 61. Relay 64 operates through the energization of its upper winding, and the upper winding of relay 59 again becomes energized in series therewith. Contacts 54 again operate, completing the energizing circuit for the lower winding of relay 59 which remains unoperated due to the predominating effect of the upper winding.

At its inner lower armature and front contact the relay 64 completes for itself a holding circuit traced from battery 69 through the lower winding of relay 64, the noted front contact and armature of that relay, conductor 71, back contact and armature of relay 59, conductor 68 and inner armature and front contact of relay 57 to ground, relay 64 thus being locked in parallel with relay 57 through the armature and back contact of relay 59. At the outer lower armature and front contact of relay 64 a ground additional to that supplied through the outer lower armature and front contact of relay 57 is connected through conductor 68 and the armature and back contact of relay 59 for locking relays 57 and 64, the additional ground being supplied for a purpose which will be described later. At its remaining armatures the relay H prepares individual energizing circuits for the relays 76, 77, 78, 79 and 81.

Following the reception of the code combination for the letter H and the operation and locking of relay 64, the code combination for selecting a receiving station will be received by selector magnet 52. It will be assumed that this code combination represents the letter R and the momentary closure of contacts 82 will occur. These contacts will complete a circuit from ground through the third upper armature and front contact of relay 64, counting from the top, conductor 83, lower winding of relay 77 to conductor 58, downwardly along that conductor to conductor 60 and through the upper winding of relay 59 to battery 61. Relay 77 operates over this circuit. The operation of contacts 82 is accompanied by the closure of universal contacts 54 which again complete a circuit from ground through conductor 55, the inner lower armature and front contact of relay 57 and the lower winding of relay 59 to battery 62. The lower winding of relay 59 is again unable to operate the relay because the upper winding is energized in series with the lower winding of relay 77.

Relay 77 completes for itself a locking circuit from battery 84 through conductor 86, the upper winding and inner upper armature and front contact of relay 77, innermost lower armature and back contact of relay 76, middle lower armatures and back contacts of relays 78 and 79, conductor 87 and armature and back contact of relay 81 to ground. It will be noted that the locking circuit just traced includes an armature and back contact of each of the relays 76, 78 and 79. It follows from this that upon the energization of any one of these three relays the locking circuit of relay 77 will be interrupted and that relay will be released, as will be more fully described later. At its three lower armatures, relay 77 interrupts similar locking circuits individual to the three relays 76, 78 and 79 for the purpose of releasing any one of those relays that might have been operated and locked. At its outer upper armature and front contact the relay 77 completes a circuit from ground through the winding of relay 88 and conductor 89 to battery 91.

The relay 88 operates and at its upper armature, in make-before-break sequence, connects telegraph line 92 to the marking contact of receiving relay 38 and disconnects the telegraph line 92 from battery 93. Line 92 extends to receiving station 94 in Fig. 3 and is connected to ground through the winding of the selector magnet 96 of a teletypewriter printer which may be of the same type as the one designated 11 in Fig. 1, and the selector magnet 96 is intended to represent such a teletypewriter printer. Since two-way transmission over telegraph line 92 is not contemplated, the teletypewriter at station 94 may not be equipped with transmitting mechanism, or if it is so equipped the transmitter will be arranged to transmit over some other communication circuit, not shown. The relay 88 also completes a circuit from battery 97 through its lower armature and front contact, signal conductor 98, winding of relay 99 at station 94 to ground. A circuit is completed by relay 99 from the left-hand terminal of battery 101, the armature and front contact of relay 99 and the winding of relay 102 to the right-hand terminal of battery 101. Relay 102 operates and locks in a circuit through its upper armature and front contact and unlocking key 103. At its lower armature the relay 102 completes the circuit of signal lamp 104. By virtue of the manually releasable locking circuit the lamp 104 will remain lighted after relays 77, 88 and 99 have been released, thereby serving to indicate that a message has been received.

The battery 93 in Fig. 2, which is connected to telegraph line 92 when relay 88 is not energized, holds telegraph line 92 closed and maintains selector magnet 96 energized which is the normal idle condition when a message is not being transmitted to the station 94. Upon the connection of telegraph line 92 to the marking contact of relay 38, the selector magnet 96 is responsive to telegraph signals received over line 34 and repeated by relay 38.

Returning to consideration of the monitoring selector mechanism in Fig. 2, the code transmitted to and received by relays 36, 37, 38 and 39 next after the station selecting code is designated Letters. The monitoring selector is not provided with contacts operable in response to this code, or if there are such contacts they are not employed in this system. In response to the reception of this code combination the universal contacts 54 again operate momentarily. These contacts again complete the energizing circuit of the lower winding of relay 59. However, no other contacts are concurrently operated to connect ground to conductor 58, so that the upper winding of relay 59 does not become energized. With the upper winding of relay 59 not energized, the lower winding is enabled to operate the armature to the front contact which it does. As the armature of relay 59 leaves its back contact it disconnects the locking windings of relays 57 and 64 from the duplicate ground connections supplied through their respective outer lower armatures and front contacts to conductor 68 and transfers those ground connections to its own lower winding, thereby establishing for itself a holding circuit. Since the holding circuits for relays 57 and 64 have been interrupted these relays release, each disconnecting ground from the holding circuit for the lower winding of relay 59 and when both ground connections have been disconnected the relay 59 will release. The purpose in transferring the holding ground connections of relays 57 and 64 to relay 59 is to assure that relay 59 shall not release solely as a result of the reopening of universal contacts 54, and the purpose in supplying the duplicate ground connections from relays 57 and 64 individually is to assure that relay 59 shall not release until after both of the others have released. The condition of the relay circuit in Fig. 2 at this time is that only the relays 77 and 88 are energized.

Figure 3:
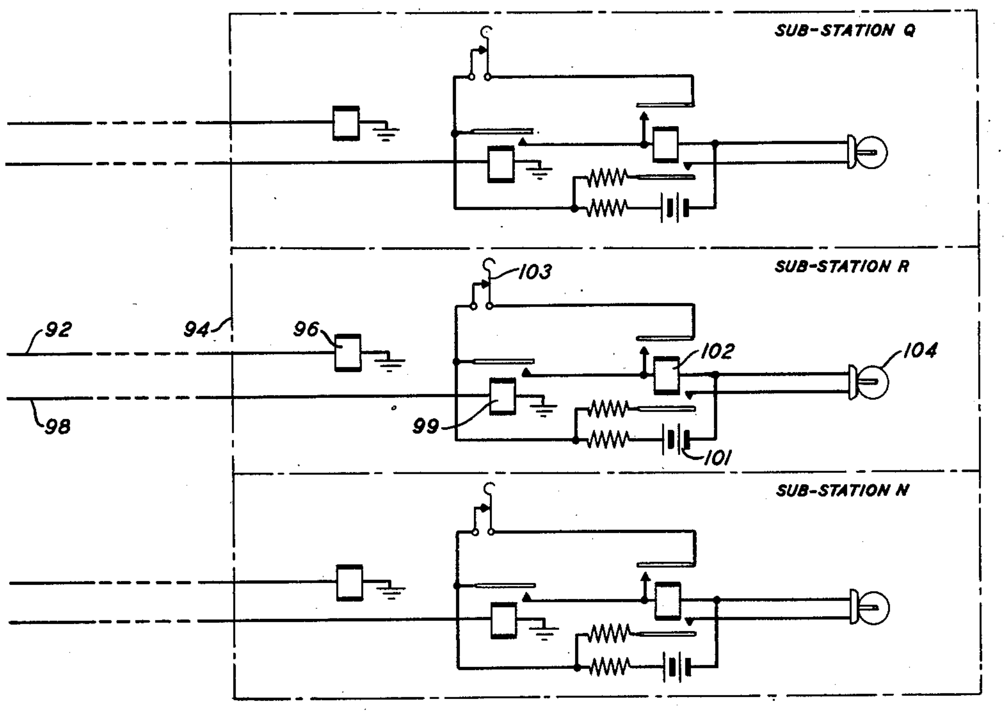
Fig. 3 is a view showing the circuits of receiving stations associated with telegraph lines served by the switching station in Fig. 2.

The next signal to be received will probably be carriage return and line feed signals, assuming that the teletypewriter printer with which station 94 in Fig. 3 is equipped, is a page printer, it being customary to make certain that the received message shall begin at the beginning of a new line on the paper in the teletypewriter printer. The monitoring selector in Fig. 2 has contacts momentarily closable in response to the carriage return and line feed signals but no use is made of these contacts in this system.

The carriage return and line feed signals are followed by the body of the message. Relay 38 will repeat the message to receiving station 94 where it will be recorded. Selector magnet 52 of the monitoring selector also responds to these signals and the contacts corresponding to those signals will be operated, but none of the relays 76, 78, 79 and 81 is able to respond to the operation of those contacts because their energizing circuits are open at front contacts of relay 64 which is released. The body of the message may include the Figures code combination and this will cause the operation and locking of relay 57. The only relays that are operable after relay 57 has been operated and locked are the relay 59 responsive to operation of the universal contacts 54 and the relay 64 operable in response to operation of the letter H. The sequence Figures and H is not used in the body of a message since this sequence is used for activation of the switching relay system. In response to the next code combination, whatever it may be, and regardless of whether or not it operates any of the contacts in the monitoring selector, the universal contacts 54 will complete the energizing circuit of the lower winding of relay 59 which will operate and lock, interrupting the locking circuit of relay 57 which will release and thereby interrupt the locking circuit of relay 59 which will also release.

At the end of the message, transmission ceases, leaving relays 77 and 88 operated and telegraph line 92 connected to the marking contact of relay 38.

It will be noted that the telegraph channel 34 extends across Fig. 3 and into Fig. 4 and that it has repeating relays 111, 112 and 113 connected to it in series. The marking contact of relay 111 is connected through the winding of selector magnet 52′ to ground. The selector magnet 52′ is the receiving instrumentality of a monitoring selector mechanism like that shown in Fig. 4. It has Figures contacts 53′ for energizing magnet 57′, H contacts 66′ for completing the circuit of relay 64′ and universal contacts 54′ for completing the circuit of the lower winding of relay 59′. It also has contact 82′ representing the letter R corresponding to the contacts 82 in Fig. 2. During the transmission of the codes for Figures and H which activated the relay switching system in Fig. 2 preparatory to the operation of relay 77 as previously described, relays 57′ and 64′ operated and locked in the same manner. When the code combination for R was received and effected the operation of contacts 82 and relay 77 in Fig. 2, contact 82′ in Fig. 4 closed and completed a circuit from ground through conductor 116′, the outermost upper armature and front contact of relay 64′, the winding of relay 81′, conductor 58′, conductor 60′ and the upper winding of relay 59′ to battery 61′. Relay 81′ operated by relay 59′ did not operate because although its lower winding was energized in a circuit completed from contacts 54′, the upper winding predominated and held it unoperated. Relay 81′ has no locking circuit and its function is to disconnect ground from conductor 87′. This conductor is common to the locking circuit of relays 121, 122 and 123, so that had any of these relays been locked at that time it would have been unlocked and released.

Figure 5:
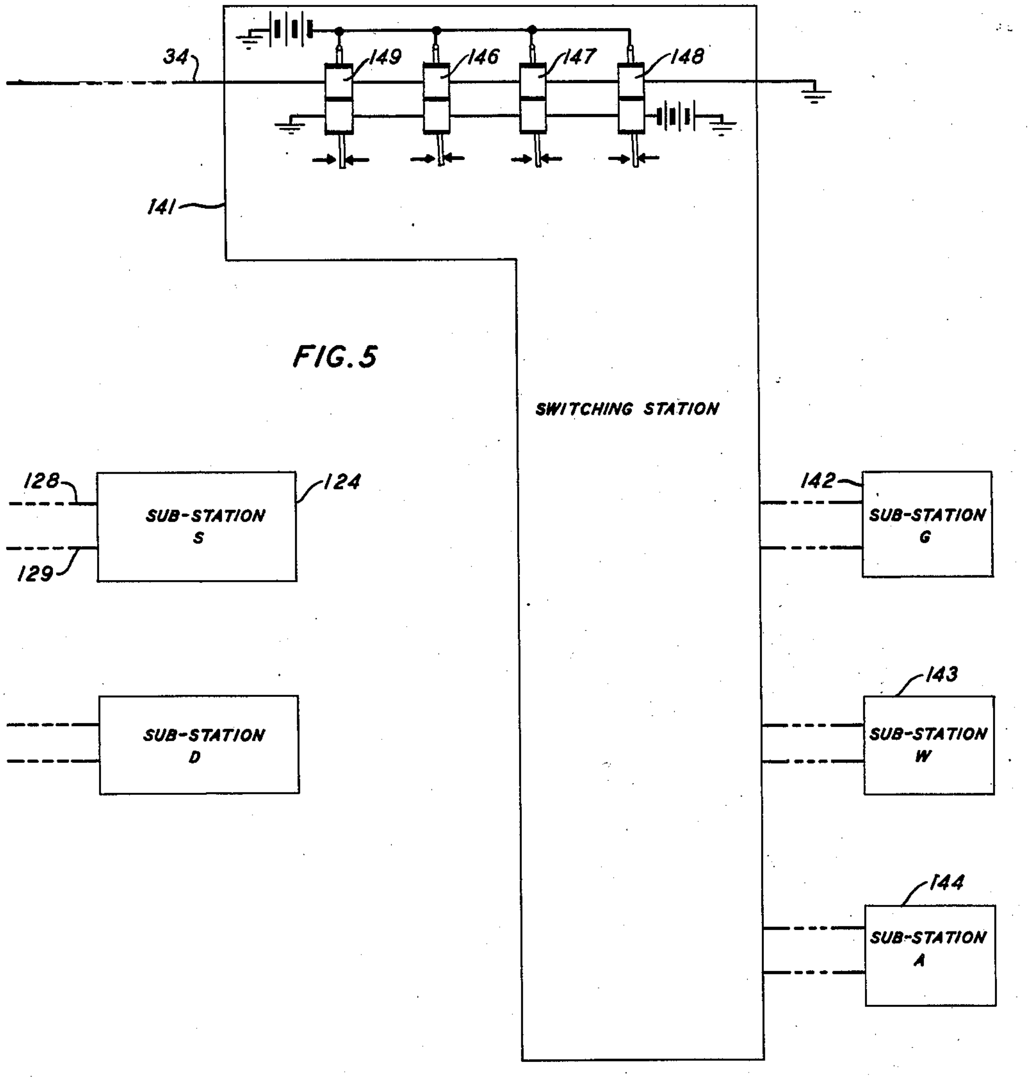
Fig. 5 is a view showing diagrammatically the receiving stations connected to lines served by the switching station in Fig. 4 and also showing in diagrammatic form a third switching station and receiving stations and lines served by it.

It will now be assumed that the next message to be transmitted is directed to a receiving station served by the switching station shown in Fig. 4, this being the station 124 in Fig. 5. This station is selectable in response to the calling code combination representing the letter S. Accordingly, the sequence of code combinations preceding the message will be Figures, H, S, Letters, Carriage return and Line feed. In response to the code combinations for Figures and H, relays 57 and 64 in Fig. 2 and relays 57′ and 64′ in Fig. 4 operate and lock, relays 59 and 59′ remaining unoperated. The code combination for the letter S causes contacts 126 in Fig. 2 and contacts 126′ in Fig. 4 to operate. Contacts 126′ complete a circuit from ground through the second armature and front contact of relay 64′, counting from the top, lower winding of relay 121, conductor 58′ and upper winding of relay 59′ to battery 61′. Relay 121 locks in a circuit from battery 84′ through conductor 86′, the upper winding of relay 121, the inner upper armature and front contact of that relay and a series path through armatures and back contacts of relays 122 and 123 and conductor 87′ to ground on the armature of relay 81′. Relay 121 completes the energizing circuit of relay 127 which connects telegraph line 128 of receiving station 124 to the marking contact of repeating relay 112. Relay 127 also connects battery to signal conductor 129 to operate the signal lamp circuit (not shown) at station 124, which may be the same as that described with respect to the receiving station 94 in Fig. 3.

In response to the Letters code combination which follows the selecting code for the station 124, the contacts 54′ complete the energizing circuit for the lower winding of relay 59′ which operates because its upper winding is not concurrently energized and releases the relays 57′ and 64′, these relays in turn releasing relay 59′. Thereafter the signals of the message transmitted over telegraph channel 34 are received by station 124.

During the selection of station 124 in response to the activating codes Figures and H and the station selecting code S the monitoring selector of the switching station shown in Fig. 2 responded to these codes, operating and locking the relays 57 and 64 in response to the activating codes. The contacts 126 close in response to the station selecting code S and complete a circuit from ground through those contacts, conductor 116, the outermost upper armature and front contact of relay 64, winding of relay 81, conductors 58 and 60, upper winding of relay 59 to battery 61. Relay 81 operates in series with the upper winding of relay 59 and disconnects ground from conductor 87 which is included in the previously traced locking path for relay 77 which operated and locked to connect station 94 in Fig. 3 to repeating relay 38 for reception of the preceding message. Relay 77 releases and in turn releases relay 88 thereby disconnecting telegraph line 92 from repeating relay 38 and reconnecting battery 93 to telegraph line 92 to hold the teletypewriter printer at station 94 in the normal idle condition. With this arrangement the telegraph line 92, having been connected to received signals from telegraph channel 34, remains connected and becomes disconnected, not in response to activation of the monitoring selector at the switching station shown in Fig. 2 but only in response to the actual selective connection of another telegraph line to receive signals from telegraph channel 34.

By reference to Fig. 2 it will be noted that contacts of the monitoring selector responsive to the letters S, Q, G, W, D and A are connected to conductor 116 so that upon the closure of any of those contacts after the relay 64 has been operated, the relay 81 will be operated to open the locking circuit of any of the relays 76, 77, 78 and 79 that they may then be operated. These contacts are identified by the reference numerals 126, 136, 137, 138 and 139, respectively. The contacts 126′ and 138′, corresponding to the contacts 126 and 138, are effective, when relay 64′ has been operated, to complete the operating circuits of relays 121 and 122 in Fig. 4.

There is shown diagrammatically in Fig. 5 a third switching station 141 serving receiving telegraph stations 142, 143 and 144 and having repeating relays 146, 147 and 148 associated with telegraph channel 34 and individual to the stations 142, 143 and 144 to repeat signals to those stations when selected. The switching station 141 also has repeating relay 149 associated with telegraph channel 34 for controlling the monitoring selector at that station. The stations 142, 143 and 144 in Fig. 5 have been designated by the calling codes G, W and A, respectively, and in response to these selecting codes the contacts 136, 137 and 139 in Fig. 2 are operable to cause the operation of releasing relay 81 when the relay 64 is operated. From this it follows that when any receiving station served by the switching station shown in detail in Fig. 4 or served by the switching station 141 indicated diagrammatically in Fig. 5 is selected, the operation of the switching contacts at the station shown in Fig. 2 corresponding to those receiving stations will be operated to disconnect any station served by the switching station in Fig. 2 that may then be connected. Similarly, the stations designated by the calling codes Q, R and N in Fig. 3, being served by the switching station shown in Fig. 2 and being selectable by the contacts 151, 82 and 152, the contacts 151′, 82′ and 152′ and also the contacts 136′, 137′, and 139′ at the switching station shown in Fig. 4 are connected to operate relay 81′ and disconnect any connected station served by the switching station shown in Fig. 4 when a station served by the switching station shown in Fig. 2 or Fig. 5 is selectively connected to receive signals. Finally, at the switching station shown in Fig. 5, the contacts responsive to the station selecting codes Q, R, N, S and D would be connected to operate the release relay at the switching station shown in Fig. 5.

The system includes provision for the broadcasting of a message to all receiving stations. Such a message is preceded by the activating codes Figures, and H and the letter U. The relays 57 and 64 at the switching station in Fig. 2 and the relays 57′ and 64′ at the switching station in Fig. 4 and corresponding relays at the switching station 141 in Fig. 5 will be operated. The selecting code U has been assigned to the broadcast selection, and in Fig. 2 a circuit will be completed from ground through contacts 160, the innermost upper armature and front contact of relay 64, lower winding of relay 79, conductor 60 and upper winding of relay 59 to battery 61. Relay 79 operates and locks in a circuit from battery 84 through the upper winding of relay 79, inner upper armature and front contact of that relay, middle lower armature and back contact of relay 76, innermost lower armature and back contact of relay 77, outermost lower armature and back contact of relay 78, conductor 87 and back contact and armature of relay 81 to ground. At its three lower armatures the relay 79 interrupts the locking circuits for relays 76, 77 and 78 so that if any of those relays has been in the operated condition it will be released. Relay 79 also completes the energizing circuit for relay 161 through its outer upper armature and front contact. Relay 161 operates and connects ground through its three armatures and front contacts and through individual conductors to the windings of relays 162, 88 and 163 and thence to battery 91. Relays 162, 88 and 163 operate and connect the three receiving stations in Fig. 3 to the repeating relays 37, 38 and 39 in Fig. 2 and also operates the signal circuits at the three receiving stations.

At the switching station shown in Fig. 4, the contacts 160′ operate and complete a circuit from ground through the innermost armature and front contact of relay 64′, lower winding of relay 123, conductor 60′ and upper winding of relay 59′ to battery 61′. Relay 123 operates and locks in a circuit from battery 84′ through conductor 86′, the upper winding of relay 123, its inner upper armature and front contact, the inner lower armature and back contact of relay 121, the outer lower armature and back contact of relay 122, conductor 87′ and back contact and armature of relay 81′ to ground. At its lower armatures the relay 123 interrupts the locking circuits for the relays 121 and 122 so that if either of these relays had been energized it will be released. At its outer upper armature and front contact relay 123 completes the energizing circuit for relay 166 which operates and completes circuits from ground through its armatures and front contacts, individual conductors, the windings of relays 127 and 167, conductor 89′ to battery 91′. Relays 127 and 167 operate and connect the two receiving stations in Fig. 5 served by the switching station in Fig. 4 to the repeating relays 112 and 113. Similarly, switching station 141 in Fig. 5 will respond to the broadcast selection code to connect stations 142, 143 and 144 to repeating relays 146, 147 and 148, respectively. The Letters signal following the broadcast code will release relays 57 and 64 in Fig. 2, relays 57′ and 64′ in Fig. 4 and the corresponding relays of the switching station 141 in Fig. 5. The message that is thereafter transmitted will be received at all of the receiving stations. Upon the subsequent selection of a single receiving station to receive a message, such as the station 94 served by the switching station in Fig. 2, the broadcast selecting relay 79 will be released upon the interruption of its locking circuit at the innermost lower armature and back contact of station selecting relay 77. At the switching station shown in Fig. 4 broadcast selection relay 123 will be released by the operation of relay 81′ in response to reception of a station selecting code assigned at the switching station in Fig. 2 but unassigned at the switching station in Fig. 4 and therefore connected to conductor 116′ to operate relay 81′.

It will be understood that additional receiving stations may be served by any switching station, the switching station in Fig. 2 being cited as an example, by the addition of relays corresponding to the relays 76, 77 and 78 energizable through switching contacts now appearing unassigned in Fig. 2 and by the provision of additional locking circuit break contacts for the relays 76, 77, 78 and 79, one set of break contacts for each station selecting relay added to the switching station. At all other switching stations the corresponding switching contacts would be connected to operate the release relay, in the case of the switching station shown in Fig. 4, such contacts being connected to conductor 116′.

It will also be understood that there may be special circumstances under which there would be no occasion to transmit broadcast messages to certain receiving stations. It might, for example, be assumed that there is no occasion to transmit a broadcast message to the receiving station in Fig. 3 having the calling code Q. This station could be excluded from broadcast transmission merely by omitting an energizing circuit for relay 162 from an armature and front contact of relay 161. There also might be special system conditions under which it would be desirable to transmit messages of a certain type to specified receiving stations representing a group and other types of messages to other receiving stations representing a different group, with or without having certain of the receiving stations common to both groups. This could be accomplished, again taking Fig. 2 as an example, by adding a relay corresponding to the relay 79, operable in response to a particular calling code, having its locking circuit under the control of all other switching relays and arranged to control the locking circuits of those relays, and also adding a relay corresponding to the relay 161 to complete the energizing circuits of those of the relays 168, 88, 163 and other like relays associated with the telegraph lines of receiving stations to be included in the group. Several relays corresponding to the relay 79 could be added to select various combinations of the relays 162, 88, 163 and others in response to group calling codes. Similar group switching relays could be added to other switching equipment such as the one shown in Fig. 4, to be operated in response to the selecting codes for those groups which included one or more receiving stations served by that switching station. At any switching station serving receiving stations, none of which is to be selected as part of a group, the monitoring selector contacts operable in response to the calling code signal of that group would be connected to operate the release relay, such as the relay 81 in Fig. 2 and the relay 81' in Fig. 4, for the purpose of disconnecting any receiving station telegraph line, served by that switching station, that might have been connected to receive the preceding message. It follows from all of the foregoing that the selection of any single receiving station telegraph line or group of those lines to receive a message will result in the disconnection anywhere in the system of any station or stations that were connected to receive the preceding message and are not to receive the current message.

Although a specific embodiment of the invention has been disclosed in the drawings and described in the foregoing specification, it will be understood that the invention is not limited to such specific embodiment but is capable of modification, rearrangement and substitution of parts and elements without departing from the spirit of the invention and within the scope of the appended claims.

What is claimed is:

1. In a telegraph switching system, a transmitter, a transmission channel associated therewith, a plurality of switching stations each having signal responsive switching means associated with said channel, a plurality of lines connectable to said channel at each of said switching stations, a receiving station associated with each of said lines, means controlled by the switching means at each switching station for selectively connecting the lines of that switching station to said channel, and switching elements for disconnecting any connected line only upon the selective connection of another of said lines to said channel.

2. In a telegraph switching system, a transmitter, a transmission channel associated therewith, a plurality of switching stations each having signal responsive switching means associated with said channel, a plurality of lines connectable to said channel at each of said switching stations, a receiving station associated with each of said lines, means controlled by the switching means at each switching station for selectively connecting the lines of that switching station to said channel, and switching elements at each switching station for disconnecting any connected one of its lines upon response of its switching means to signals assigned to connect one of the lines of another switching station.

3. In a telegraph switching system, a transmitter, a transmission channel associated therewith, signal responsive switching means associated with said channel, a plurality of relays selectively operable by said switching means, line connecting elements controlled by said relays for connecting said lines to said channel, a locking circuit for each of said relays including break contacts controlled by all other of said relays whereby the operation of any one of said relays unlocks any one of them that is then locked in operated condition, and a locking circuit interrupter operable directly by said switching means for interrupting said locking circuits.

4. In a telegraph switching system, a transmitter, a transmission channel associated therewith, a plurality of switching stations each having signal responsive switching means associated with said channel, a plurality of lines connectable to said channel at each switching station, a receiving station associated with each of said lines, a plurality of relays at each station selectively operable by the switching means thereat upon response of said switching means to assigned code signals, line connecting elements controlled by the relays at each switching station for connecting the associated lines to said channels, a locking circuit for each of said relays including break contacts controlled by all others of said relays at the same switching station whereby the operation of one of said relays at a switching station unlocks any one of them at that station that is locked in operated condition, and a locking circuit interrupter operable directly by each of said switching means upon response thereof to a code signal assigned to effect the operation of a relay at any other switching station for interrupting the locking circuits of the relays associated with that switching means.

5. In a telegraph switching system, a transmitter, a transmission channel associated therewith, a plurality of switching stations each having signal responsive switching means associated with said channel, a plurality of lines connectable to said channel at each of said switching stations, a receiving station associated with each of said lines, means controlled by the switching means at each switching station for selectively connecting the lines of that switching station to said channel, means operable by each of said connecting means at a switching station for disconnecting any other line then connected to said channel at that switching station, and switching elements at each switching station for disconnecting any connected one of its lines upon response of its switching means to signals assigned to connect one of the lines of another switching station.

CHARLES ROBERT WALKER.

REFERENCES CITED

The following references are of record in the file of this patent:

UNITED STATES PATENTS

| Number | Name | Date |
|---|---|---|
| 1,765,538 | Nelson | June 24, 1930 |
| 2,361,342 | Willis | Oct. 24, 1944 |
| 2,380,007 | Zenner | July 10, 1945 |
| 2,388,733 | Fischler et al. | Nov. 13, 1945 |

FOREIGN PATENTS

| Number | Country | Date |
|---|---|---|
| 108,213 | Great Britain | Aug. 2, 1917 |